United States Patent [19]

Desselle

[11] Patent Number: 5,752,088
[45] Date of Patent: May 12, 1998

[54] AERIAL PHOTOGRAPHY DEVICE

[76] Inventor: Alex S. Desselle, 33443 Nancy Dr., Walker, La. 70785

[21] Appl. No.: 794,046

[22] Filed: Feb. 3, 1997

[51] Int. Cl.$^6$ .................................................. G03B 39/00
[52] U.S. Cl. .......................................... 396/12; 348/144
[58] Field of Search .......................... 396/7, 12; 348/89, 348/144, 157

[56] References Cited

U.S. PATENT DOCUMENTS

| | | | |
|---|---|---|---|
| 367,610 | 8/1887 | Fairman . | |
| 578,980 | 3/1897 | Eddy . | |
| 894,348 | 7/1908 | Seele . | |
| 1,301,967 | 4/1919 | Parks . | |
| 3,485,151 | 12/1969 | Taylor | 95/12.5 |
| 3,917,199 | 11/1975 | DeWitt | 244/118 |
| 4,204,656 | 5/1980 | Seward, III | 244/30 |
| 4,669,843 | 6/1987 | Bozzolato | 354/74 |
| 4,752,791 | 6/1988 | Allred | 354/81 |
| 4,825,232 | 4/1989 | Howdle | 354/74 |
| 4,891,029 | 1/1990 | Hutchinson | 446/58 |
| 5,034,759 | 7/1991 | Watson | 354/67 |

Primary Examiner—David M. Gray
Attorney, Agent, or Firm—Russel O. Primeaux

[57] ABSTRACT

An aerial photography device is disclosed. The device includes a blimp filled with lighter than air gas or some other structure which will keep the device aloft. The device will also include a servo platform for positioning and moving the aerial photography device in the air and a camera platform. Both the servo platform and camera platform are attached to a servo frame, which in turn is attached to the blimp. The camera platform has a camera mount which is pivotable about at least one axis of rotation. A remote transmitter and a receiver mounted on the device allow an operator to remotely control the servo platform and the camera platform.

18 Claims, 5 Drawing Sheets

AERIAL PHOTOGRAPHY DEVICE

BACKGROUND OF THE INVENTION

1. Field of the Invention

This invention relates, generally, to devices for aerial photography and sensing, and particularly, to such devices which are remotely controlled from the ground.

2. Prior Art

In photography, it is often desirable to take aerial photographs, that is, pictures taken from a point above the subject of the photograph. For example, a farmer with a large farm may want an aerial photograph of the entire farm. To take such a photograph, the camera must be put at a point in the air.

Several devices have been used to accomplish the goal of putting the camera in the air. The camera can be placed in a piloted aircraft, such as a helicopter or a fixed-wing aircraft, and a human operator can control the camera from the aircraft. U.S. Pat. No. 3,485,151 to Taylor discloses a camera mounting which secures under a helicopter. U.S. Pat. No. 3,917,199 to Dewitt discloses another type of camera mounting device for aircraft.

U.S. Pat. No. 5,034,759 to Watson discloses a camera which is mounted to a balloon which is tethered to the operator on the ground and a remote control device which can be used to control the device via electronic signals sent along a wire which runs along the tether. U.S. Pat. No. 5,034,759 also discloses the use of leveling structures which are intended to stabilize the camera in two dimensions. The operator moves the entire device around by moving the ground while holding the tether.

An ideal aerial photography platform should have the capability to stay fixed in one place with minimal power needs and with little or no vibration. Fixed-wing remotely piloted vehicles are unable to stay in a fixed location and helicopter remotely piloted vehicles, consume a disproportionate amount of power to remain stationary, and require elaborate suspension systems to dampen the vibration.

An ideal device should also provide the controller the ability to control the device without the use of a tether. The wireless control capability will be especially useful in situations when the ground to be photographed is completely or partially inaccessible; as would be the case with a swamp or a contaminated environment. The device should also provide the operator with the ability to control the position not only of the device, but also the position of the camera mounted on the device. The devices of the prior art have failed to meet all of the necessary requirements of the ideal aerial photography device.

OBJECTS OF THE INVENTION

It is an object of the present invention to provide an aerial photography device which can stay aloft with the use of a relatively small amount of power and with minimal vibration of the camera mount.

Another object of the present invention is to provide an aerial photography device which allows the operator to control the position of the camera mount and the position of the aerial photography device independently.

Another object of the present invention is to provide an aerial photography device which can remain fixed in a position while consuming a relatively small amount of power.

Another object of the present invention is to provide an aerial photography device which can be remotely controlled by an operator without the use of a tether.

SUMMARY OF THE INVENTION

An aerial photography device is provided. The device includes a buoyancy means such as a blimp or balloon which will allow the device to maintain altitude, a servo platform which is attached to the buoyancy means and which can position the device in three dimensions in the air, a camera platform which is attached to the servo platform or to the buoyancy means and is pivotable through at least one plane; and a remote controller which will allow an operator to remotely control the servo platform and the camera platform. In a preferred embodiment the device will be equipped with gyroscopes which will maintain the entire device and the camera platform in a certain orientation.

A feature of the invention is that various imaging means can be attached to the camera mount.

A further feature of the invention is that the modular construction of the servo frame will allow the operator to tailor the device to specific applications by the installation of various application platforms which are operationally connected to the receiver.

A further feature of the invention is that it can be used to in areas which are unsafe for humans.

A further feature of the invention is that it can access areas which conventional remotely controlled helicopters or fixed wing aircraft cannot reach.

These and other objects, advantages, and features of this invention will be apparent from the following descriptions of the invention.

DETAILED DESCRIPTION OF THE PREFERRED EMBODIMENTS

Figure 1:
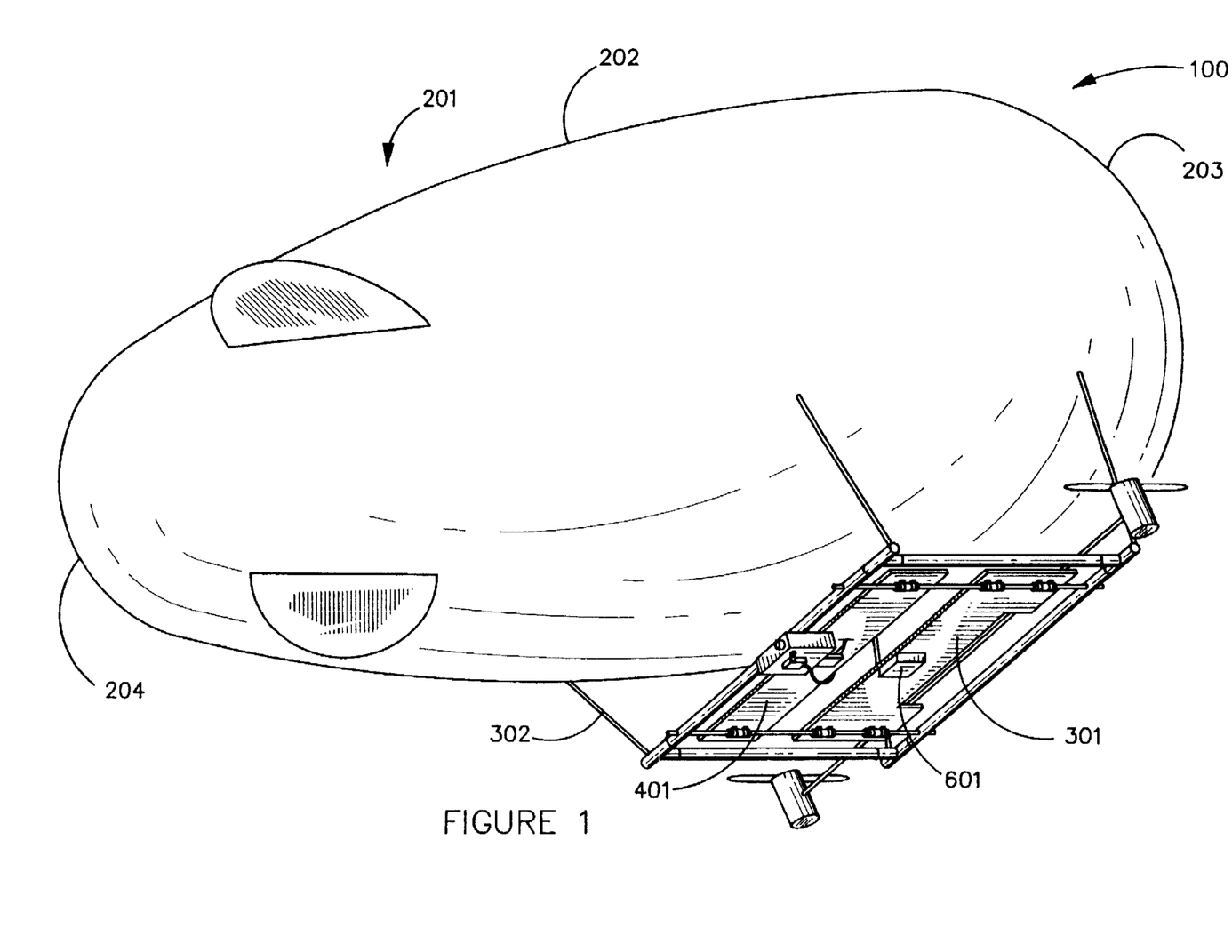
FIG. 1 is a perspective view of the aerial photography device.

Referring to FIG. 1, aerial photography device 100 is depicted. The main elements of the device are buoyancy means 201, servo platform 301, camera platform 401, and control means 501 (pictured in FIG. 6). Buoyancy means 201 will provide sufficient lift to aerial photography device 100 so that the device can maintain altitude. Ideally, the operator of the device will calculate the total weight of the device and use a buoyancy means which provides sufficient lift to allow the device to remain neutrally buoyant.

Although neutral buoyancy is preferred by this inventor, others skilled in the art may want negative buoyancy so that if the motors stop operating the device will return to the ground. Or they may prefer positive buoyancy to save power which must be expended to maintain altitude for a negatively buoyant device.

Although in the embodiment depicted, buoyancy means 201 is a blimp filled with helium, one could use blimps or balloons filled with other lighter than air gases or any other conventional means or methods suitable for creating a body which will stay aloft and to which the other components of aerial photography device 100 may be attached. In one embodiment, buoyancy means 201 is a blimp with the following specifications: length—15 ft., volume—255 cu. ft., lift capacity—9.6 lbs., gas—helium.

Servo platform 301 is preferably positioned below buoyancy means 201 so that the center of gravity of the entire device will be below the geometric center of buoyancy means 201. Such a configuration will provide greater stability to the device. Servo platform will include servo frame 303. Servo frame 303 will preferably be constructed of a lightweight rigid material such as carbon-graphite or titanium, although other materials, such as stainless steel, may be used. Servo frame has frame ends 304, 305 and frame sides 306, 307.

Servo frame 303 is attached to buoyancy means 201 by four attachment arms 302 which will be rigid or semi-rigid members. Each attachment arm 302 is attached at one end to buoyancy means 201 and at the other end to servo platform 301. For the embodiment, depicted in which buoyancy means 201 is blimp 202, attachment arms 302 will attach to blimp 202 at tabs or grommets on blimp 202 and to servo platform 301 at the points where frame ends 304, 305 meet frame sides 306, 307.

Motor rod 308 is parallel to frame ends 304, 305 and will include two motors 309 which are rigidly attached to motor rod 308. In the embodiment depicted each motor 309 is a motor having an operating voltage range (direct drive mode) of 3.6 V to 8.4 V and a no load speed of 18,200 RPM. A motor with these characteristics which is commercially available is the Graupner brand Model Speed 600. Each motor 309 will include a propeller 310. Motor 309 and propeller 310 are chosen to be of sufficient size so that they can propel aerial photography device 100 relatively quickly and so that aerial photography device 100 can operate in at least moderate wind conditions. In the embodiment depicted each propeller 310 is a conventional model aircraft propeller compatible with the type of motor (gas or electric) used. Such a propeller which is commercially available is the Master Airscrew® Model No. MA1310BE (13" diameter, 10" pitch).

Figure 2:
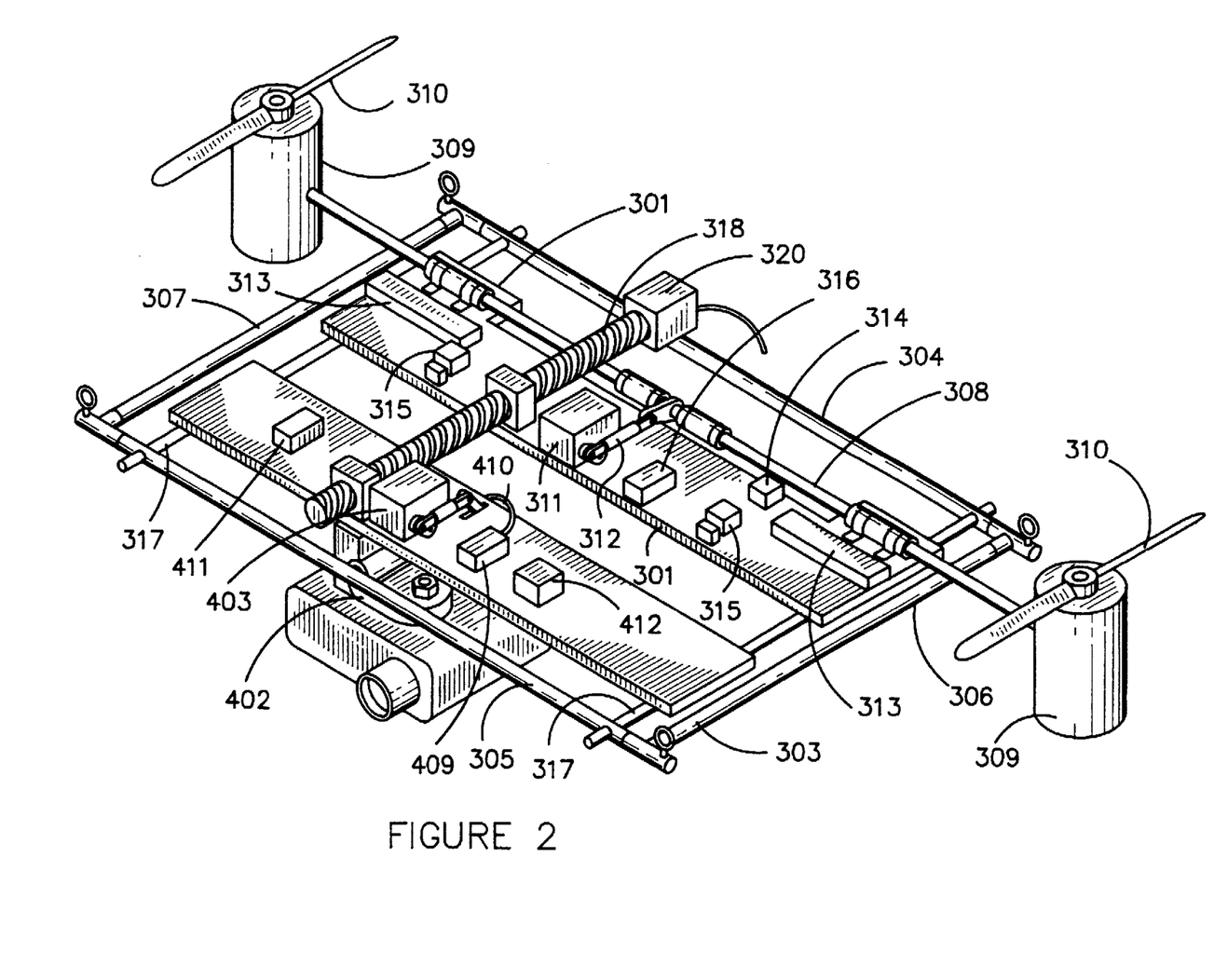
FIG. 2 is a perspective view of the servo platform and camera platform installed on the servo frame.

Servo platform 301 will also include global servo 311 which is fixably mounted on servo platform 301. Global servo 311 is operably connected to motor rod 308 by global servo link 312. As shown in FIG. 2, global servo link 312 is configured so that global servo 311 can cause motor rod 308 to rotate about its long axis. When motor rod 308 is rotated in this manner, the orientation of motors 309 will be changed and motors 309 will propel aerial photography device 100 in a particular direction.

Each motor 309 will be controlled by motor speed controller 315 and powered by motor power supply 313. Motor speed controller 313 will be a variable VDC output which can adjust the electrical current supplied to motor 309. The wiring from motor speed controllers 313 to motor 309 is not shown. An example of a motor speed controller which is commercially available is the Futaba® Model No. FP-MC114H.

One could design aerial photography device 100 so that the operator uses only manual control to maintain aerial photography device 100 in a particular position and orientation. However, in a preferred embodiment servo platform 301 will also include global gyroscope 314 and its corresponding global controller 316, both of which are fixably attached to servo platform 301. When global gyroscope 314 senses a change in its orientation, global controller 316 will produce a global controller output signal which is sent to global servo 311. In response to the global controller output signal global servo 311 will rotate said motor rod as necessary to orient aerial photography device 100 in a stable position. Any suitable gyroscope may be used. In the embodiment depicted global gyroscope 314 and all of the other gyroscopes later described are the same. A commercially available gyroscope which is suitable for use as global gyroscope 314 or as one of the other gyroscopes is the Futaba® Rate Gyro Model FP-G3.

The sensitivity of global gyroscope 314 and global controller 316 can be varied as desired. Additionally, global servo 311 will also rotate motor rod 308 in response to control by the operator.

In the embodiment depicted, a single global gyroscope 314 and single global controller 316 are used to keep aerial photography device 100 stable with regard to pitch. Pitch is the orientation which would indicate whether the nose of aerial photography device 100 is above, below, or level with the tail.

In a preferred embodiment one could use up to two additional sets of global gyroscopes paired with global controllers. These additional sets of global gyroscopes and global controllers would be operably connected to global servo 311 and to motor speed controllers 315. These additional sets of global gyroscopes and global controllers would send signals to global servo 311 and to motor speed controllers 315 which would keep aerial photography device 100 stable with respect to roll and yaw. One would need to add a paired gyroscope and controller for each additional dimension in which gyroscopic control is desired.

When the global gyroscope which detects yaw sensed a change in its orientation, that global gyroscope's corresponding global controller would (1) send a signal to global servo 311 to orient motor rod 308 so that the axis of rotation of propellers 310 had at least some horizontal component and (2) send signals to the two separate motor speed controllers 315 which would cause motors 309 to run at different speeds.

When the global gyroscope which detects roll sensed a change in its orientation, that global gyroscope's corresponding global controller would (1) send a signal to global servo 311 to orient motor rod 308 so that the axis of rotation of propellers 310 had at least some vertical component and (2) send signals to the two separate motor speed controllers 315 which would cause motors 309 to run at different speeds.

Figure 3:
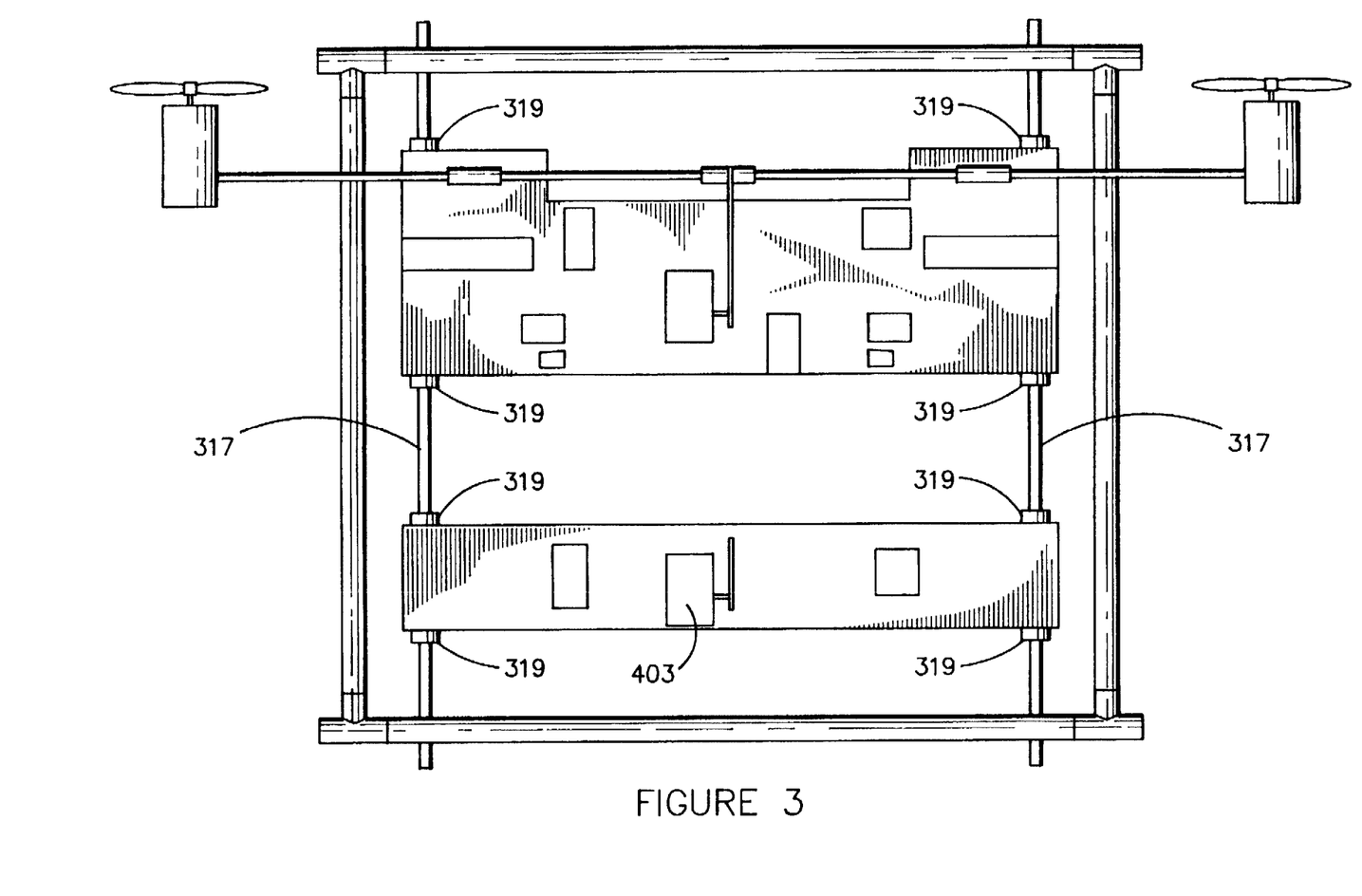
FIG. 3 is a plan view of the servo platform and camera platform installed on the servo frame.

As shown in FIG. 3, aerial photography device 100 will also have camera platform 401. In the embodiment depicted camera platform 401 is attached to servo frame 303 but those skilled in the art could also attach camera platform 401 and servo platform 301 directly to buoyancy means 201. In a preferred embodiment both servo platform 301 and camera platform 401 will be slidably mounted on slider rods 317 which are attached to servo frame 303. The use of slider rods 317 will allow the operator to vary the positioning of servo platform 301 and camera platform 401 so as to properly balance the load of aerial photography device 100.

In a particularly preferred embodiment shown in FIG. 2 worm gear 318 and worm gear motor 320 will be used to move both servo platform 301 and camera platform 401 back and forth along slider rods 317, even while the device is in flight. Alternatively, as shown in FIG. 3, one could manually position servo platform 301 and camera platform 401 along slider rods 317, and then fix the platforms in position with collars 319. Collars 319 will include set screws (not shown) which will hold collars 319 in place on slider rod 317.

The inventor believes that it will be advantageous to have various platforms which may be interchanged for camera platform 401 and attached to servo frame 303 for various applications. For example, one could place sensors of various types on different platforms and interchange these platforms as needed for a particular application.

Figures 4, 5:
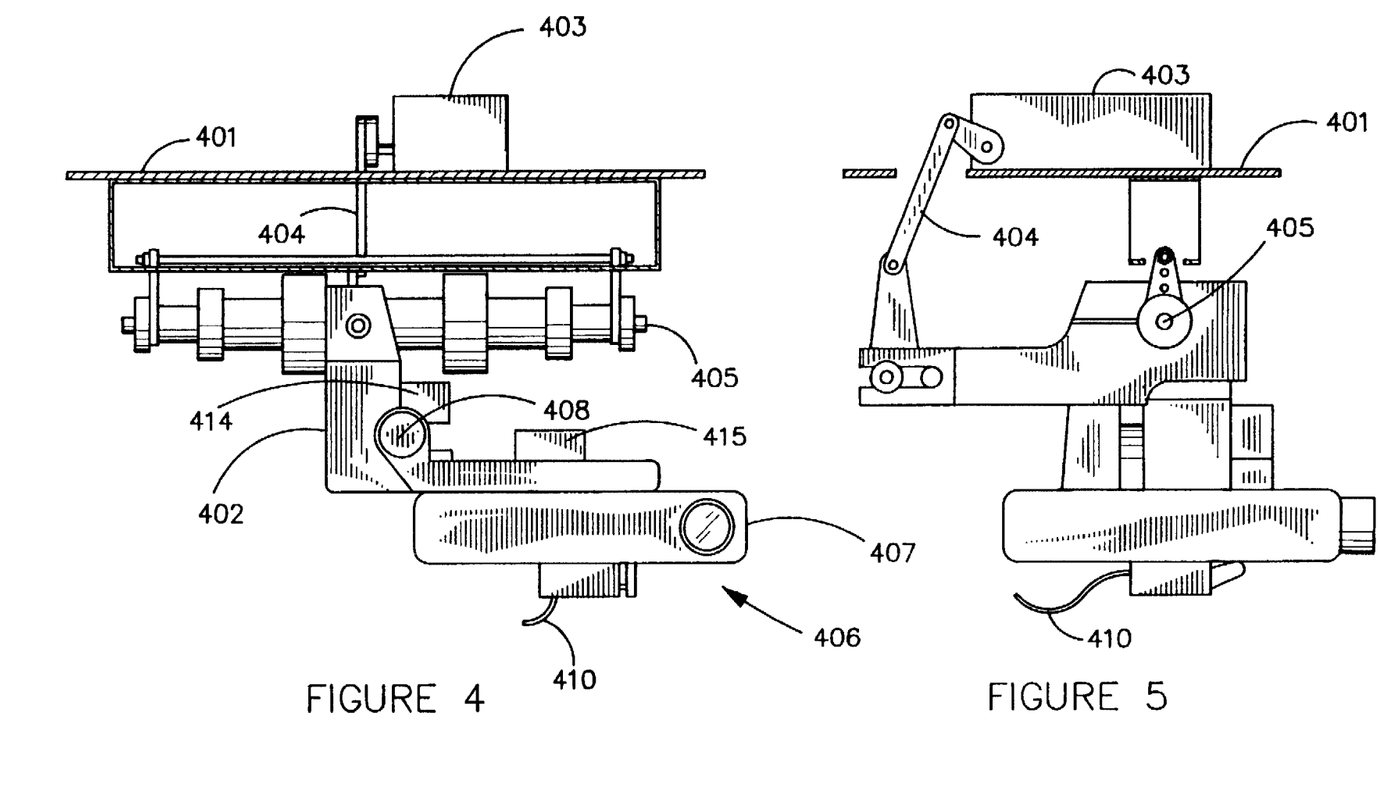
FIG. 4 is a front elevation of the camera platform.
FIG. 5 is a side elevation of the camera platform.

In the embodiment depicted, camera platform 401 will include camera mount 402 which is pivotable through one plane. As shown in FIGS. 4 and 5, this pivoting feature is accomplished by the use of first camera position servo 503 which is attached to camera platform 401. First camera position servo 503 is connected to camera mount 402 by camera position servo link 404. First camera position servo 503 is operably connected by wiring (not shown) to receiver 601 so that the operator on the ground can remotely control first camera position servo 503. Camera position servo link 401 is configured so that first camera position servo 503 can cause camera mount 402 to rotate about the axis defined by first camera mount pivot point 405. When camera mount 402 is pivoted in this manner, the orientation of imaging means 406 which has been mounted in camera mount 402 can be changed as desired. The particular imaging means 406 shown in FIGS. 4 and 5 is digital camera 407.

In a preferred embodiment, the particular camera installed in camera mount 402 will be controlled by at least one camera actuator servo 409, which will use cable actuator linkage 410 to control the shutter, for example, of digital camera 407. One may also use additional camera actuator servos to control other camera functions, such as lens focus, f stop, and shutter speed. Camera actuator servo 409 will be operably connected by wiring (not shown) to receiver 601 so the ground-based operator can control camera actuator servo 409. In another embodiment (not shown), for some imaging means 406, such as digital camera 407, camera actuator servo 409 may be attached directly to the camera. Such a configuration would eliminate the need for cable actuator linkage 410.

In some embodiments of the invention first camera position servo 403 would be solely under the manual control of the operator. In a preferred embodiment camera platform 401 will also include camera gyroscope 411 which is operably connected by wiring (not shown) to its corresponding camera position controller 412, both of which are fixably attached to camera platform 401. When camera gyroscope 411 senses a change in its orientation, camera position controller 412 will produce a camera position controller output signal which is sent to first camera position servo 403. In response to the camera position controller output signal first camera position servo 403 will pivot camera mount 402 as necessary to maintain camera mount 402, and in turn the affixed imaging means 406, in a stable orientation with respect to the pivoting of camera mount 402 through one plane of rotation.

The sensitivity of camera gyroscope 411 and camera position controller 412 can be varied as desired. Additionally, first camera position servo 403 can also be set to operate in response to control by the operator.

Although in some embodiments one will only need first camera position servo 503 which pivots camera mount 402 through only one plane, it may be preferable to have two or three camera position servos which can pivot camera mount 402 through two or three planes of rotation as shown in FIG. 4. These additional camera position servos will each have a corresponding camera position controller, camera gyroscope, and pivot point.

As shown in FIG. 4, second camera position servo 414 will rotate camera mount 402 about second camera mount pivot point 408. Third camera position servo 415 will maintain camera mount 402 stable in an axis of rotation defined by the camera attachment bolt (not shown).

Second camera position servo 414 and third camera position servo 415 will each have a corresponding camera gyroscope and camera position controller (not shown) which will be operably connected to the corresponding camera position servo. When its camera gyroscope senses a change in orientation, the corresponding camera position controller would send an output signal to its corresponding camera position servo, which would rotate camera mount 402 so as to keep it stable in the particular plane of rotation.

Figure 6:
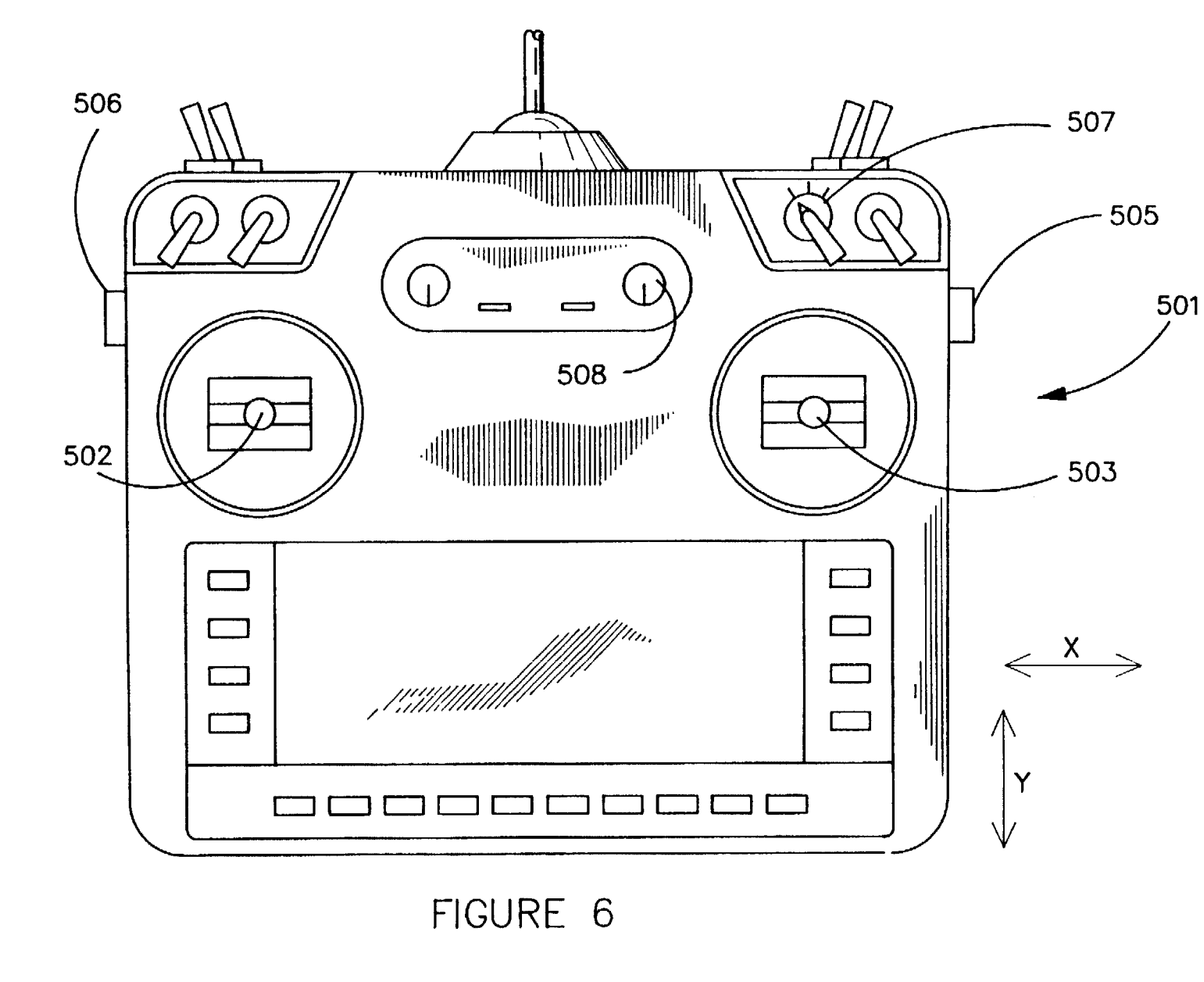
FIG. 6 is a plan view of one embodiment of the transmitter.

The final major component of aerial photography device 100 is control means 501. In the embodiment depicted control means 501 is a conventional radio wave transmitter 504 with the capability to transmit on up to 10 channels. Transmitter 504 is compatible with receiver 601.

Transmitter 504 may be programmed so that various functions correspond to particular controls. For example, for a two motor embodiment transmitter 504 may be programmed so that the horizontal movement of left gimbal control 502 controls the speed of one motor on aerial photography device 100 and the horizontal movement of right gimbal control 503 controls the speed of the other motor. The horizontal direction is indicated by the line labeled X.

Transmitter 504 can also be programmed so that the speed of both motors 309 will be controlled on a single channel. For example, the speed of both motors could be controlled on right dial control 505. Although in the embodiment depicted, control means 501 is a radio wave transmitter, one could use infrared, sound, visible light, or other types of transmitters or any other conventional means or methods suitable for transmitting wireless signals using a compatible receiver.

Receiver 601 will have at least the same number of channels as the number of active channels on transmitter 504. In the embodiment depicted receiver 601 is attached to the underside of servo platform 301, although one could attach receiver 601 to any place on buoyancy means 201, servo platform 301, or camera platform 301 so long as receiver 601 can be connected by wiring (not shown) to the various devices which it controls, and so long as the antennae (not shown) for receiver 601 can hang receiver 601.

In the embodiment depicted, with transmitter 504 having eight available channels, the channels may be set as shown in the table below.

| Channel | Item Controlled | Placement |
|---|---|---|
| 1 | unused | |
| 2 | left motor control | left slider 506 (vertical movement - as indicated by line Y) |
| 3 | right motor control | right slider 505 (vertical movement - as indicated by line Y) |
| 4 | global controller | left gimbal 502 (vertical movement - as indicated by line Y) |
| 5 | unused | |
| 6 | camera tilt controller | right gimbal 503 (vertical movement - as indicated by line Y) |
| 7 | camera actuator servo | three position switch 507 |
| 8 | camera pan controller | right dial 508 |

Those skilled in the art may want to assign functions to different channels and control switches on the transmitter.

Additionally those skilled in the art will add channel assignments as needed if extra gyroscopes and servos are desired. Preferably transmitter 504 will have a memory capability which will allow the user to define settings for various flight conditions and store and load those into transmitter 504 and which will allow the user to define various configurations depending on the sensors installed on servo platform 303.

A commercially available transmitter which has such a capability is the Futaba® Model No PCM 1024Z, which has the memory capability for 10 configurations, with each configuration having 10 conditions. Examples of configurations which might be programmed and saved in memory are a servo platform with a camera platform with a digital camera, a servo platform with a camera platform with a video camera, or a servo platform with an environmental sensing platform. Examples of conditions which could be stored include gyro sensitivity, control switch and stick settings, and preset outputs for servo speed and settings.

It will be obvious to those skilled in the art to use other transmitters. Those skilled in the art could also adapt receiver 601 to respond to signals from electronic navigation systems such as the global positioning satellite system, either instead of, or in combination with, signals received from transmitter to aid in the control capabilities.

There are of course other alternate embodiments which are obvious from the foregoing descriptions of the invention, which are intended to be included within the scope of the invention, as defined by the following claims.

I claim:

1. An aerial photography device comprising:
   (1) a buoyancy means for providing sufficient lift to said photography device so that said photography device can maintain altitude;
   (2) a servo frame, said servo frame being fixably attached to said buoyancy means;
   (3) a servo platform attached to said servo frame, said servo platform comprising:
      (a) at least two motors fixably attached to a motor rod, each said motor having a propeller;
      (b) a global servo fixably attached to said servo platform and operably attached to said motor rod, said global servo adapted such that said global servo can rotate said motor rod about the long axis of said motor rod;
      (c) for each motor, a motor speed controller for independently controlling the speed of each said motor;
      (d) a global gyroscope fixably attached to said servo frame; and
      (e) a global controller attached to said servo platform and operably connected to said global gyroscope and said global servo, said global controller and said global gyroscope being adapted such that when said global gyroscope senses a change in orientation from a selected position in at least one dimension, said global controller will cause said global servo to position said motor rod as necessary to maintain said device in said selected position in one dimensions;
   (3) a camera platform attached to said servo frame, said camera platform having a camera mount which is pivotable through at least one plane; and
   (4) a control means for remotely controlling said servo platform and said camera platform.

2. The aerial photography device in claim 1, further comprising:
   a receiver operably connected to said global servo, said global controller, and said motor speed controller; said receiver being adapted to receive wireless transmissions from said control means.

3. The aerial photography device in claim 1, further comprising:
   (1) a camera mount connected to said camera platform, said camera mount being pivotable in at least one plane of rotation;
   (2) a first camera position servo fixably attached to camera platform and operably connected to said camera mount, said first camera position servo adapted such that said first camera position servo can pivot said camera mount in at least one plane of rotation; and
   (3) a camera actuator servo for actuating a camera placed in said camera mount.

4. The aerial photography device in claim 3 wherein said camera platform further comprises:
   (1) a camera gyroscope fixably attached to said camera platform, and
   (2) a camera position controller attached to said camera platform and operably connected to said camera gyroscope and said first camera position servo, said camera position controller and said camera gyroscope being adapted such that when said camera gyroscope senses a change in orientation from a selected position, said camera position controller will cause said first camera position servo to position said camera mount as necessary to maintain said camera mount in a selected position in at least one dimension.

5. The aerial photography device in claim 4, further comprising:
   a receiver operably connected to said global servo controller, said motor speed controller, and said camera position controller, said receiver being adapted to receive wireless transmissions from said control means.

6. The aerial photography device in claim 2, further comprising:
   an imaging means connected to said camera mount, said imaging means being operably connected to said receiver, said receiver and said control means adapted such that said control means can control the operation of said imaging means.

7. The device in claim 1 wherein:
   (1) said servo frame further comprises one or more slider rods fixably attached to said servo frame;
   (2) said camera platform and said servo platform further comprise collars adapted to slide along said slider rods; and
   (3) said camera platform, said collars, and said slider rods are adapted such that said servo platform and said camera platform can be selectively and manually positioned along said slider rods.

8. The device in claim 2 wherein:
   (1) said servo frame further comprises one or more slider rods fixably attached to said servo frame;
   (2) said camera platform and said servo platform further comprise collars adapted to slide along said slider rods; and
   (3) said camera platform, said collars, and said slider rods are adapted such that said servo platform and said camera platform can be selectively and manually positioned along said slider rods.

9. The device in claim 3 wherein:
   (1) said servo frame further comprises one or more slider rods fixably attached to said servo frame;
   (2) said camera platform and said servo platform further comprise collars adapted to slide along said slider rods; and (3) said camera platform, said collars, and said slider rods are adapted such that said servo platform and said camera platform can be selectively and manually positioned along said slider rods.

10. The device in claim 4 wherein:
(1) said servo frame further comprises one or more slider rods fixably attached to said servo frame;
(2) said camera platform and said servo platform further comprise collars adapted to slide along said slider rods; and p1 (3) said camera platform, said collars, and said slider rods are adapted such that said servo platform and said camera platform can be selectively and manually positioned along said slider rods.

11. The device in claim 5 wherein:
(1) said servo frame further comprises one or more slider rods fixably attached to said servo frame;
(2) said camera platform and said servo platform further comprise collars adapted to slide along said slider rods; and
(3) said camera platform, said collars, and said slider rods are adapted such that said servo platform and said camera platform can be selectively and manually positioned along said slider rods.

12. The device in claim 6 wherein:
(1) said servo frame further comprises one or more slider rods fixably attached to said servo frame;
(2) said camera platform and said servo platform further comprise collars adapted to slide along said slider rods; and
(3) said camera platform, said collars, and said slider rods are adapted such that said servo platform and said camera platform can be selectively and manually positioned along said slider rods.

13. The device in claim 1 further comprising:
(1) one or more slider rods fixably attached to said servo frame;
(2) a worm gear motor fixably attached to said servo frame;
(3) a worm gear operably connected to said worm gear motor, said servo platform, and said camera platform; and
(3) wherein said worm gear and said worm gear motor are adapted such that as said worm gear is rotated by said worm gear motor said servo platform and said camera platform can be selectively positioned along said slider rods.

14. The device in claim 2 further comprising:
(1) one or more slider rods fixably attached to said servo frame;
(2) a worm gear motor fixably attached to said servo frame;
(3) a worm gear operably connected to said worm gear motor, said servo platform, and said camera platform; and
(3) wherein said worm gear and said worm gear motor are adapted such that as said worm gear is rotated by said worm gear motor said servo platform and said camera platform can be selectively positioned along said slider rods.

15. The device in claim 3 further comprising:
(1) one or more slider rods fixably attached to said servo frame;
(2) a worm gear motor fixably attached to said servo frame;
(3) a worm gear operably connected to said worm gear motor, said servo platform, and said camera platform; and
(3) wherein said worm gear and said worm gear motor are adapted such that as said worm gear is rotated by said worm gear motor said servo platform and said camera platform can be selectively positioned along said slider rods.

16. The device in claim 4 further comprising:
(1) one or more slider rods fixably attached to said servo frame;
(2) a worm gear motor fixably attached to said servo frame;
(3) a worm gear operably connected to said worm gear motor, said servo platform, and said camera platform; and
(3) wherein said worm gear and said worm gear motor are adapted such that as said worm gear is rotated by said worm gear motor said servo platform and said camera platform can be selectively positioned along said slider rods.

17. The device in claim 5 further comprising:
(1) one or more slider rods fixably attached to said servo frame;
(2) a worm gear motor fixably attached to said servo frame;
(3) a worm gear operably connected to said worm gear motor, said servo platform, and said camera platform; and
(3) wherein said worm gear and said worm gear motor are adapted such that as said worm gear is rotated by said worm gear motor said servo platform and said camera platform can be selectively positioned along said slider rods.

18. The device in claim 6 further comprising:
(1) one or more slider rods fixably attached to said servo frame;
(2) a worm gear motor fixably attached to said servo frame;
(3) a worm gear operably connected to said worm gear motor, said servo platform, and said camera platform; and
(3) wherein said worm gear and said worm gear motor are adapted such that as said worm gear is rotated by said worm gear motor said servo platform and said camera platform can be selectively positioned along said slider rods.

* * * * *